UNITED STATES PATENT OFFICE.

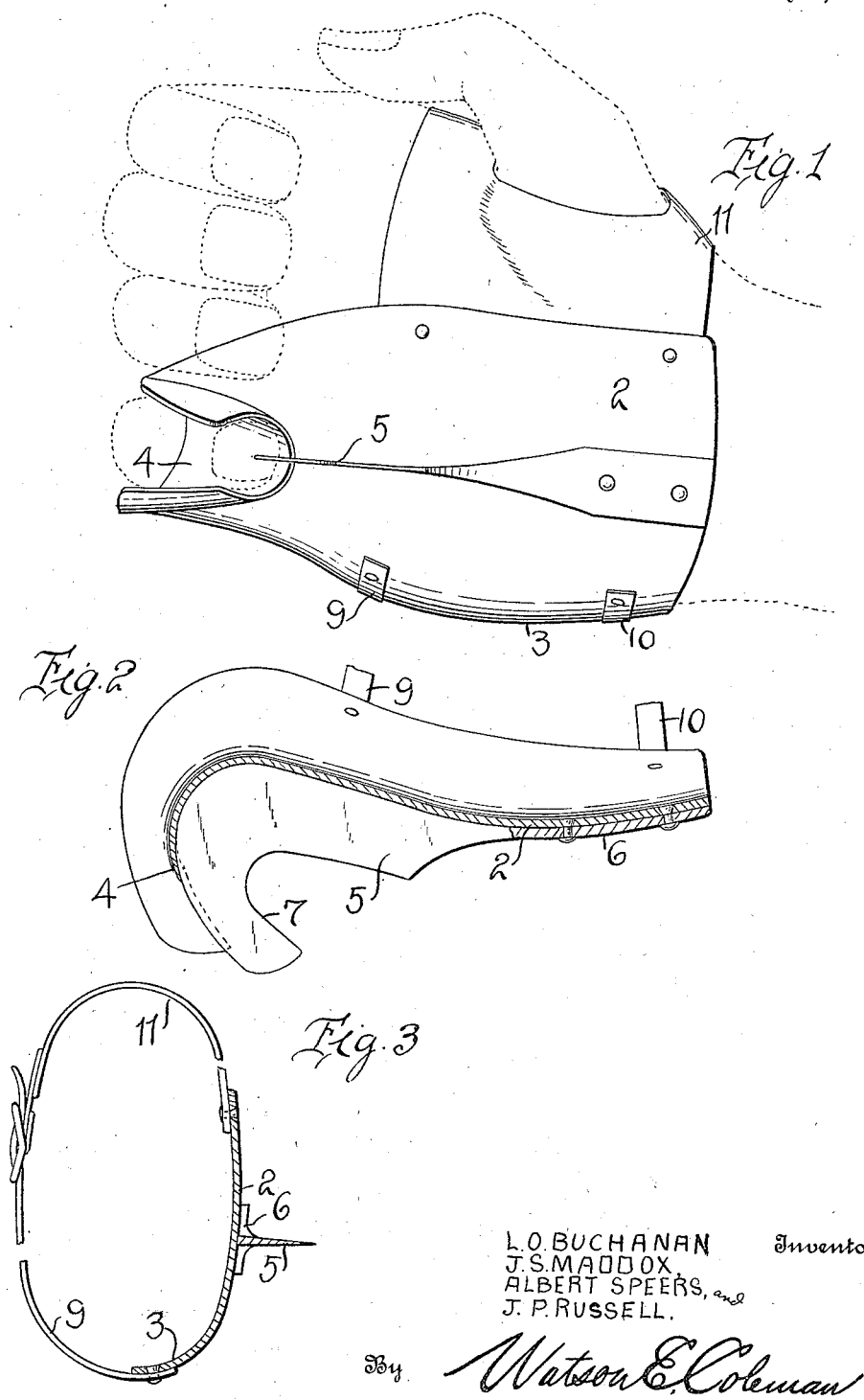

LEMUEL O. BUCHANAN AND JOHN S. MADDOX, OF GOODLETT, JAMES P. RUSSELL, OF ACME, AND ALBERT SPEERS, OF KIRKLAND, TEXAS.

CORN-HEADING KNIFE.

1,181,429.  Specification of Letters Patent.  Patented May 2, 1916.

Application filed July 26, 1915. Serial No. 41,999.

*To all whom it may concern:*

Be it known that we, LEMUEL O. BUCHANAN and JOHN S. MADDOX, citizens of the United States, residing at Goodlett, in the county of Hardeman, State of Texas, and JAMES P. RUSSELL and ALBERT SPEERS, citizens of the United States, residing at Acme, in the county of Hardeman, and Kirkland, in the county of Childress, State of Texas, respectively, have invented certain new and useful Improvements in Corn-Heading Knives, of which the following is a specification, reference being had to the accompanying drawings.

This invention relates to implements for cutting corn, and particularly to that class of corn cutters which are intended to be attached to the hand and are used more particularly for heading maize.

In certain parts of this country the main grain crop for farm animals is what is known as milo maize and Kafir corn. The heads of this maize or corn are cut off for feed and the ordinary pocket knife is used for this purpose.

The primary object of our invention is the provision of a very simple and effective knife which can be strapped to the hand and which will enable the harvester to cut a relatively large amount of work.

A further object of the invention is the provision of a knife which will thoroughly protect the hand of the harvester in the cutting operation, and which has a blade so formed that the cutting of the corn is very easy.

A further object of the invention is the provision of a knife so formed that it will protect and shield one of the fingers of the hand while leaving the remainder of the fingers free to grasp the heads of corn cut by the knife.

Other objects will appear in the course of the following description.

Our invention is illustrated in the accompanying drawings, wherein:

Figure 1 is a front view of our improved header in actual use; Fig. 2 is a longitudinal sectional view; and Fig. 3 is a transverse sectional view.

Referring to these figures it will be seen that our improved heading knife consists of a base 2 which is in the form of a relatively thin plate of metal, this plate being so made that one face thereof will conform to the contour of the palm of the hand, or at least that portion of the palm adjacent and below the little finger. As illustrated, the base is formed of a relatively thin sheet of metal which is bent to have the conformation above described, this sheet being of such dimensions as to extend about half way over the palm of the hand from the side of the hand adjacent the little finger to the base of the thumb, as shown clearly in Fig. 1, leaving, however, the thumb entirely free.

The base upon one side edge is rearwardly bent, as at 3, so as to conform to the side of the hand. The upper portion of the base is contracted in width and transversely curved on a very much smaller radius than the base itself so as to provide a forwardly projecting extension 4, which extension is transversely concavo-convex upon its upper face so as to receive one of the fingers of the hand and particularly the little finger, the side walls of this finger guard or extension extending upward on each side of the finger and entirely protecting it. Attached to the outer face of the base 2 in any suitable manner, or formed as part of the base, is a blade 5. As illustrated, the lower portion of this base is transversely flattened, as at 6, and riveted to the base, but we do not wish to be limited to this particular manner of attaching the knife blade in place. The blade 5 beyond this flattened portion extends perpendicularly to the face of the base and its upper end is forwardly and downwardly curved, as at 7, the downwardly projecting bill of the knife so formed extending beyond the end of the guard 4, as at 8. The outer edge of the knife is thus hook-shaped. The upper edge of the blade 5 is connected or attached to the guard 4 in any suitable manner.

Any suitable means may be provided for holding this heading knife to the hand, but as illustrated, a strap 9 is riveted to the upper portion of the base plate 2, this strap being adapted to be buckled or otherwise fastened around the hand, and to the lower portion of the base plate is attached the strap 10 which is adapted to be fastened around the wrist of the user. Preferably, also a thumb piece 11 is provided which is attached to the base plate and projects laterally therefrom and is formed with an opening for the passage of the thumb of the user so that the base plate with its attached knife may be held firmly and securely upon the hand. The straps 9 and 10 are preferably buckled to this thumb piece 11.

While we have illustrated the cutter as being particularly adapted for attachment to the right hand of the operator, it is of course obvious that the cutter may be so formed as to have a contour corresponding to that of the left hand, and in actual use two of these cutters may be used by one operator. It will be seen that our header provides for free use of the thumb and the first three fingers of the hand so that the fingers and thumb may be used to embrace the portion of the stalk cut off by the knife.

Having thus described the invention, what is claimed is:

1. A header of the character described including a base plate formed to conform to the palm of the hand, the base being formed with an extension adapted to receive a finger of the hand, and a knife blade mounted on said base and extending in a plane perpendicular to the surface of the base and being in line with said extension and engaging therewith and being braced thereby.

2. A header of the character described including a base plate formed to conform to a portion of the hand, the upper end of the base plate being extended and forwardly curved to provide a finger guard, said guard being laterally curved to receive the finger of the hand, and a knife blade mounted upon the face of the base plate.

3. A header of the character described including a base plate formed to conform to a portion of the hand, the upper end of the base plate being extended and forwardly curved to provide a finger guard, said guard being laterally curved to receive the finger of the hand, and a knife blade mounted upon the face of the base plate, said knife blade extending upward along the face of the base and along the under side of the finger receiving guard and formed with a hook-shaped cutting edge.

4. A header of the character described including a base plate formed to cover a portion of the palm of the hand and conform thereto, the base plate at one edge having a curved flange fitting the side of the hand below the little finger, said base plate being narrowed toward its upper end and being there formed with a forwardly and downwardly curved extension providing a little finger guard, said extension being transversely curved to receive and protect the little finger, a blade attached to the base plate at the lower end thereof extending up the face of the base plate at right angles thereto and at its upper edge being bent downward and forward to conform to the curvature of the finger, the cutting edge of the blade being hook-shaped, and means for holding the base plate upon the hand.

5. A header of the character described including a base plate formed to cover a portion of the palm of the hand and conform thereto, the base plate at one edge having a curved flange fitting the side of the hand below the little finger, said base plate being narrowed toward its upper end and being there formed with a forwardly and downwardly curved extension providing a little finger guard, said extension being transversely curved to receive and protect the little finger, a blade attached to the base plate at the lower end thereof extending up the face of the base plate at right angles thereto and at its upper edge being bent downward and forward to conform to the curvature of the finger, the cutting edge of the blade being hook-shaped, and means for holding the base plate upon the hand, said means including straps attached to the base plate and adapted to pass over the hand and a thumb piece having a thumb opening.

6. A header of the character described including a base plate formed to conform to the palm of the hand, the base being formed with an outwardly curved extension adapted to receive a finger of the hand, and a U-shaped knife blade mounted on the base extending in a plane perpendicular to the surface thereof and in line with said extension, the back of the knife blade engaging with the base and with the inner face of the extension and being braced by said extension along its outwardly projecting portion.

In testimony whereof we hereunto affix our signatures in the presence of two witnesses.

LEMUEL O. BUCHANAN.
JOHN S. MADDOX.
JAMES P. RUSSELL.
ALBERT SPEERS.

Witnesses:
 I. H. GUITHER,
 H. L. MADDOX.

Copies of this patent may be obtained for five cents each, by addressing the "Commissioner of Patents, Washington, D. C."